United States Patent [19]

Hagen et al.

[11] 4,003,121
[45] Jan. 18, 1977

[54] METHOD AND ARRANGEMENT FOR THE PRODUCTION OF ANNULAR ARTICLES

[75] Inventors: Albert Hagen, Dortmund; Theodor Kaiser, Hagen-Emst; Heinz Pohler, Herdecke-Kirchende, all of Germany

[73] Assignee: Hoesch Werke Aktiengesellschaft, Dortmund, Germany

[22] Filed: July 15, 1974

[21] Appl. No.: 488,718

[30] Foreign Application Priority Data

July 17, 1973 Germany ......................... 2336281

[52] U.S. Cl. ............................ 29/415; 148/11.5 R; 29/148.4 R; 140/88
[51] Int. Cl.² ................... C21D 9/40; B23P 17/00; B21H 1/12
[58] Field of Search .......... 29/201 D, 148.4 R, 415; 140/89

[56] References Cited

UNITED STATES PATENTS

| 654,468 | 7/1900 | Marcy | 29/415 X |
| 2,683,922 | 7/1954 | Zion | 29/415 X |
| 3,478,402 | 11/1969 | Schmude et al. | 29/148.4 R |
| 3,769,671 | 11/1973 | Knapp | 29/148.4 R |

FOREIGN PATENTS OR APPLICATIONS

| 503,187 | 4/1939 | United Kingdom | 29/148.4 |

*Primary Examiner*—C.W. Lanham
*Assistant Examiner*—V. Rising
*Attorney, Agent, or Firm*—Michael J. Striker

[57] ABSTRACT

An elongated unhardened blank is passed between a first pair of rollers where it is conductively heated by supplying current to one of the rollers. Thereafter, the blank is further heated by induction and then passed between a second pair of rollers where it is shaped so as to impart thereto a predetermined cross-sectional configuration. The rollers of the second pair are profiled and the blank is maintained at an elevated temperature by supplying current to one of the rollers. After shaping, the blank is passed between a third pair of rollers. Current is again supplied to one of these rollers. The other roller is of a diameter corresponding to that desired for the finished annular articles and the blank is coiled about this roller. This latter roller is partially immersed in a quenching medium so that the blank is quenched and thereby hardened as it is being coiled. Coiling is continued until the number of convolutions corresponds to the number of annular articles which are to be produced. The thus-obtained coil is then subdivided by severing the same in such a manner that each convolution forms an annular article. The method and arrangement are well-suited for the production of wire races for anti-friction bearings.

10 Claims, 3 Drawing Figures

METHOD AND ARRANGEMENT FOR THE PRODUCTION OF ANNULAR ARTICLES

BACKGROUND OF THE INVENTION

The invention relates generally to the production of annular articles. Of special interest is the production of wire reces for anti-friction bearings.

Anti-friction bearings provided with wire races which have been bent into a ring-shaped or annular configuration are known. Sucn anti-friction bearings include one or more ring-shaped tracks for guiding the rolling elements of the bearing, the tracks being provided in the wire races. The tracks are formed with a predetermined bearing contact angle which is the same at each location circumferentially of the race.

Wire races for anti-friction bearings are known wherein the track is formed by a grinding operation. Here, it is also known to subject the race to a finish rolling operation so as to impart to the surface of the track a curvature which corresponds to the radius of the rolling elements, for instance, spherical balls, of the anti-friction bearing.

Wires for use in ball bearings are normally of circular cross-section and the track is formed in the round wire at a predetermined angle by a machining operation after the wire has been bent to an annular configuration. Subsequently, the track is subject to a grinding operation while maintaining this angle. This method has certain disadvantages. Thus, where grinding of the track is performed on thick wires, large quantities of material must be gound off. Moreover, this manner of treatment is costly and, in addition, causes a distortion of the race as stresses are released during the grinding operation so that the wire must be continuously readjusted. Furthermore, since the wire is hard, the grinding discs required for the grinding operation are subjected to great wear.

In the German Pat. No. 1,525,079, it has been proposed to form the requisite cross-sectional configuration of the wire race by subjecting the wire to a conventional cold-drawing operation. After being drawn in this manner, the wire is bent to annular configuration and, finally the overlapping ends of the wire are cut off to thereby obtain a wire race. In view of the high tooling costs involved, the use of such drawn wire races is economically feasible only when large quantities of wire races are to be manufactured.

The use of these known production methods becomes even more costly and more difficult when the preparation of races from wire having a wire diameter of 20 to 24 millimeters and greater is concerned and where the wire races are to be used for anti-friction bearings having a diameter of at least 2 meters. Here, bar stock may be used as the starting material. However, the length of such bar stock is usually restricted to a maximum of 6 meters. Consequently the use of wire races made from such starting material is restricted to anti-friction bearings having a diameter of at most about 1.9 meters since, for anti-friction bearings of larger diameter, it then becomes necessary to place individual wire race pieces or segments next to one another in order to form a ring which is substantially circumferentially complete. In such an event, the disadvantages associated with the use of individual segments must be coped with.

The problems just outlined may be overcome by starting from a wire coil rather than from bars of restricted length. However, if wires which have been drawn so as to impart to them the desired profile are wound into the form of a coil subsequent to the drawing operation, there exists the danger, particularly for wires of larger cross-section, that the profiles which are to serve as tracks for the rolling elements of the bearing will be damaged when the wire is unwound and is straightened in the conventional straightening apparatus. Since the wire is drawn to its final dimensions, further processing of the wire is not possible. Thus, if damage occurs, the wires cannot be used. This danger may be lessened by using round or semi-circular wires as starting material and providing these with tolerances at the track surface before winding them into a coil. This procedure, however, requires additional processing of the wire after it has been unwound.

SUMMARY OF THE INVENTION

A general object of the invention is to provide a novel method and arrangement for the production of annular articles.

Another object of the invention is to provide a method and arrangement which enables annular articles to be produced more simply than was possible heretofore.

A further object of the invention is to provide a method and arrangement which enables annular articles to be produced more economically than was possible until now.

An additional object of the invention is to provide a method and arrangement for the production of annular articles which enables even smaller production runs to be performed economically.

It is also an object of the invention to provide a method and arrangement which enables annular articles to be produced simply and economically even from wire having a wire diameter of 20 to 24 millimeters and more.

One more object of the invention is to provide a method and arrangement which enables annular articles having a diameter of 2 meters and more to be produced simply, economically and without danger of damage.

Still another object of the invention is to provide a method and arrangement for the production of wire races which enable the advantages achievable with the conventional methods utilizing cold drawing techniques to be obtained in the production of smaller quantities of wire races and which, simultaneously, enable the disadvantages associated with the preparation of wire races having a wire diameter of the above-mentioned dimensions of 20 to 24 millimeters and more to be overcome.

In accordance with the listed objects and others which will become apparent hereinafter, the invention provides a method of making ring-shaped articles, particularly wire races for anti-friction bearings having at least one track for guiding rolling elements, wherein an elongated unhardened blank is shaped so as to impart thereto a predetermined cross-sectional configuration. The blank is coiled subsequent to the shaping operation so as to produce a coiled element having convolutions of a predetermined diameter substantially equal to the desired diameter of the finished articles. The blank is also hardened subsequent to the shaping operation. The coiled element is subdivided subsequent to the hardening operation so as to produce from each of at least some of the convolutions thereof a substantially annular article.

As mentioned previously, of special interest to the invention is the production of ring-shaped or annular wire races for anti-friction bearings and, for this reason, the description herein will be with reference to such wire races although this is not intended to limit the invention. One aspect of the invention, then, relates to a method for the production of wire races and the elongated block may thus be in the form of a wire which may be bent to ring-shaped or annular configuration. The wire races may be used in anti-friction bearings or bearing assemblies having one or more ring-shaped or annular tracks for guiding the rolling elements of the bearing, and the bearing contact angle may be substantially the same at each location along the circumference of the track, that is, the bearing contact angle may be substantially constant circumferentially of a given track. In the case of wire races, the operation of shaping the blank, i.e., the wire, includes the formation of a track in the wire.

The wire may comprise a material which is hardenable when cooled, if necessary, rapidly, from a sufficiently high temperature. According to the invention, the shaping operation may be a hot-forming operation. Thus, the desired cross-sectional configuration of the wire may be produced by means of a conventional hot-rolling operation. This may be accomplished by heating the wire and passing it between a pair of profiled rollers.

According to an advantageous embodiment of the invention, the wire may be coiled and hardened substantially simultaneously. This may be achieved by bending or winding the hot-rolled, profiled wire about a member of substantially circular cross-section which is at least partially immersed in a quenching medium so that the wire is quenched and thereby hardened while being coiled. In this event, the temperature of the wire when it enters the quenching medium must, of course, be sufficiently high to permit hardening to occur when the wire is quenched. The member about which the wire is coiled may be rotatably mounted. The diameter of this member is selected in such a manner that the diameter of the convolutions of the coiled element formed during the coiling operation substantially equals the desired diameter of the finished wire races. It is also favorable, in accordance with the invention, for the track formed in the wire during the shaping operation to be formed with a predetermined bearing contact angle, that is, with a bearing contact angle corresponding to that desired in the finished races, so that the convolutions of the coiled element produced by the coiling operation are already provided with the bearing contact angle which it is desired to have in the finished races. Where a predetermined number of wire races are to be made, it is of further advantage according to the invention for the coiling operation to be carried to the point where the number of convolutions of the coiled element substantially equals the number of races which it is desired to make.

Subdivision of the coiled element may be accomplished by means of a severing or cutting device. The coiled element is advantageously severed in such a manner that each convolution thereof forms an annular or ring-shaped wire race.

According to the invention, it is of advantage for the heating of the wire prior to the shaping operation to be effected conductively using rollers for making electrical contact and to then heat the wire by induction downstream of these rollers.

One of the advantages achievable by the production method of the invention resides in the fact that it is possible to use a material which, as calculated per unit quantity of the coiled element, is inexpensive. Moreover, the unavoidable additional waste resulting from the use of bar material, which may be quite substantial, may be eliminated in accordance with the invention. A further advantage resides in that it is possible to produce bearings of larger diameter such as, for instance, of diameter larger than 1.9 meters, provided with wire race segments which extend around 360° so that a subdivision of the wires into a plurality of segments in order to produce a substantially circumferentially complete race may be avoided. The latter makes for very smooth operation in view of the fact that there then exists only one location at which wire ends meet or join. This is particularly true at higher circumferential velocities.

An additional advantage of the invention resides in that there is no need to provide devices for insuring that the desired surface smoothness as outlined above is obtained since, by using the production method of the invention, an improvement of the outer surface may be achieved without additional devices.

In another of its aspects, the invention provides, in an installation for the production of ring-shaped articles, particularly for the production of wire races for anti-friction bearings having at least one track for guiding rolling elements, a combination which includes means for shaping an elongated, unhardened blank. Means is provided downstream of the shaping means for coiling and substatially simultaneously hardening the blank to thereby produce a hardened coiled element for subdivision to a plurality of substantially annular articles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
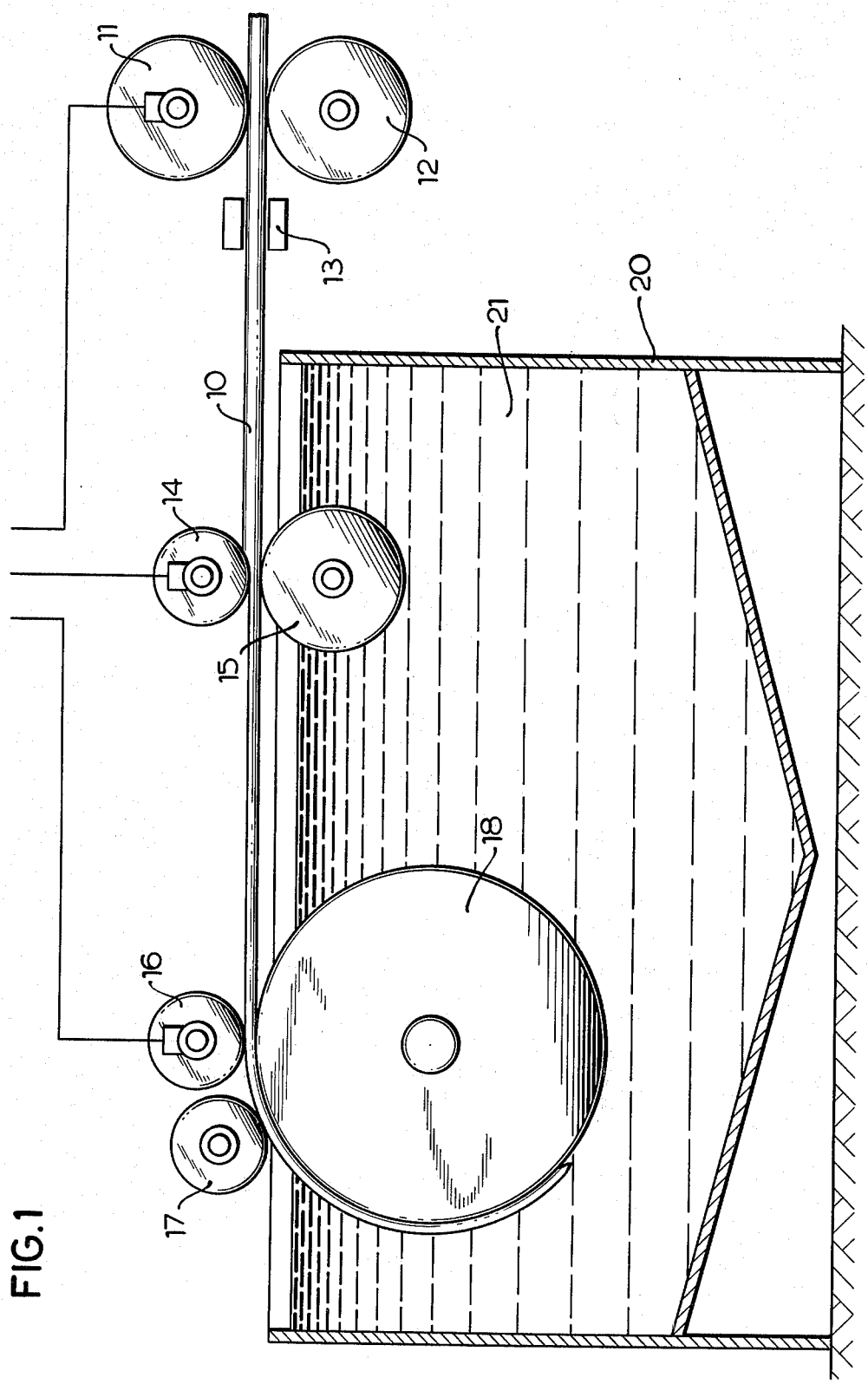
FIG. 1 is a diagrammatic representation of an arrangement according to the invention which may be used for carrying out the method of the invention.

Referring now to FIG. 1, a wire 10 which is to be converted into wire races is unwound from a non-illustrated wire coil. The wire 10 passes between a first pair of rollers 11 and 12 where it is subjected to a first heating stage. Heating of the wire 10 by means of the rollers 11 and 12 is accomplished conductively by supplying electrical current to the roller 11 as schematically illustrated.

Since the wire 10 is still cold when it enters the gap between the rollers 11 and 12 and, in the present case, is not sufficiently heated during its passage between the rollers 11 and 12, the wire 10 is next passed through a device 13 where it is inductively heated to the transformation temperature necessary for subsequently hardening it by quenching. At the same time, the induction heating insures that the temperature of the wire 10 is raised to that necessary for hot-forming it so as to impart to it the desired profile or cross-sectional configuration.

After being inductively heated by the device 13, the wire 10 next passes between a pair of rollers 14 and 15. Here, the wire 10 is shaped to the profile or cross-sectional configuration which is desired in the wire races to be made therefrom. One or both of the rollers 14 and 15 may be of profiled configuration. The wire 10 is maintained at an elevated temperature by conductively heating the same, this being accomplished by supplying electrical current to the roller 14 as schematically illustrated.

Figure 2:
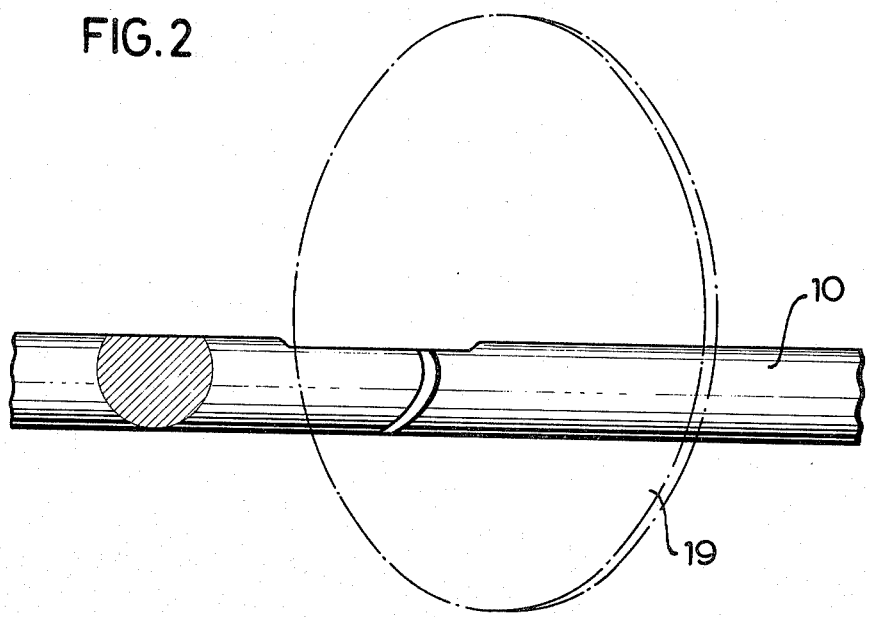
FIG. 2 is a view partially in section, showing abutting ends of a shaped wire.
Figure 3:
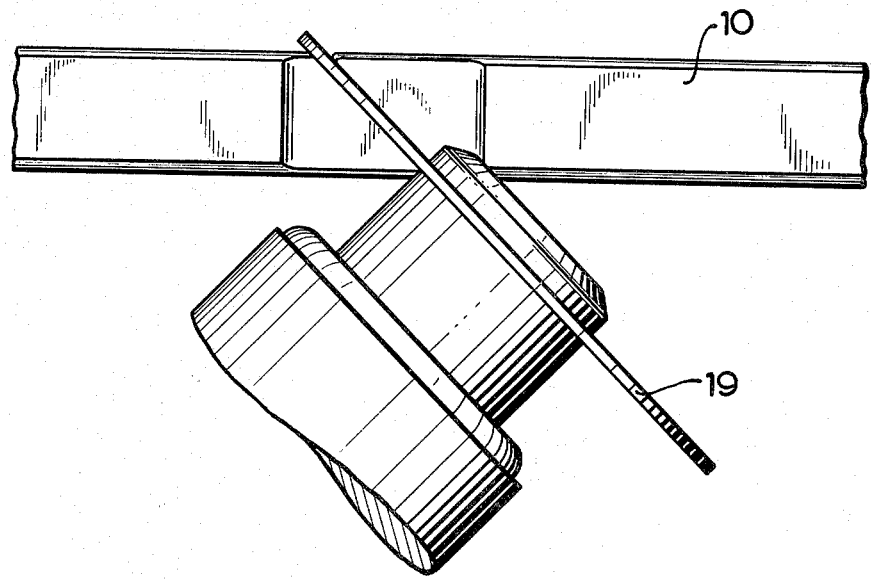
FIG. 3 is another view showing abutting ends of a shaped wire in contact with a severing device.

Subsequent to being shaped, the wire 10 passes between a roller 16 and a rotatably mounted member 18 of circular cross-section which may, for instance, be in the form of a reel, a disc or a drum. Again, the wire 10 is maintained at an elevated temperature during its passage between the roller 16 and the member 18 by conductively heating the same, this also being accomplished by supplying electrical current to the roller 16 as indicated schematically. With the aid of the roller 16 and a guiding roller 17, the wire 10 is bent around the member 18 so as to form convolutions of diameter corresponding to that desired for the finished wire races. The wire 10 is coiled into the form of a helix which is subsequently subdivided in a manner such that each convolution forms a wire race. Subdivision of the helix may be performed with a suitable severing or cutting device 19 as schematically illustrated in FIGS. 2 and 3, the former also showing the cross-sectional configuration of the wire 10 obtained in the present instance after shaping.

The member 18 is mounted for rotation in a container 20 which is filled with a quenching medium 21. Thus, as the wire 10 is bent around the member 18, it becomes immersed in the quenching medium 21. As a result of this immersion, the wire 10 is quenched and thereby hardened.

In the present instance, the wire 10 is assumed to be of steel and the transformation and hardening temperatures may lie between about 800° and 1100° C. whereas the rolling temperature may be about 50° and 100° C. less depending upon the cooling and the thickness of the wire 10.

The wire races produced from the wire 10 may be used in anti-friction bearings the details of which need not be presented here since they are well known. Of course, the ends of the wire races may be joined to one another using suitable joining procedures should such joining be necessary or desirable although it will be appreciated that terms such as ring-shaped or annular articles as used herein are intended to encompass articles whose ends have not been so joined. It will be further appreciated that the invention might be applicable to the production of articles of other than round cross-section and that terms such as ring-shaped or annular articles as used herein need not necessarily imply articles of round or circular cross-section.

It will be understood that each of the elements described above, or two or more together, may also find a useful application in other types of methods and installations differing from the types described from the types described above.

While the invention has been illustrated and described as embodied in a method and arrangement for the production of annular articles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

We claim:

1. A method of making ring-shaped articles, comprising hot-forming an elongated blank, which is in an unhardened condition and is hardenable by cooling from a predetermined elevated temperature, so as to impart to said blank a predetermined cross-sectional configuration; coiling said blank subsequent to said hot-forming, and prior to substantial cooling of said blank from the hot-forming temperature, so as to produce a coiled element having a plurality of convolutions of predetermined diameter substantially equal to the desired diameter of the finished articles, said blank having a temperature subsequent to initiation of said coiling which at least equals said predetermined temperature; cooling said blank subsequent to initiation of said coiling so as to harden said blank and obtain said coiled element in a hardened condition, said cooling comprising quenching of said blank, and said coiling and said quenching being performed substantially simultaneously by bending said blank about a rotatable member which is at least partially immersed in a quenching medium and which guides said blank into the same; and subdividing said coiled element subsequent to said quenching so as to produce from each of at least some of said convolutions a substantially annular article.

2. A method as defined in claim 1, said annular articles comprising races for anti-friction bearings; and wherein said hat-forming comprises forming a track in said blank for guiding the rolling elements of said anti-friction bearings.

3. A method as defined in claim 2, wherein said track is formed with a predetermined bearing contact angle, said bearing contact angle being substantially constant circumferentially of said annular articles.

4. A method as defined in claim 1, wherein said hat-forming comprises heating said blank and subjecting the heated blank to a rolling operation.

5. A method as defined in claim 1, wherein said hat-forming comprises passing said blank between a pair of roller members including at least one profiled roller member.

6. A method as defined in claim 1, wherein a predetermined number of annular articles of said predetermined diameter are to be made and the number of convolutions of said coiled element substantially equals said predetermined number.

7. A method as defined in claim 1, wherein said subdividing comprises severing said coiled element.

8. A method as defined in claim 1, wherein said hot-forming, said coiling and said cooling of said blank are performed substantially continuously.

9. A method as defined in claim 8, wherein said hot-forming comprises hot-forming of said blank.

10. A method as defined in claim 9, said blank comprising a wire, and said annular articles including a wire race for an anti-friction bearing; and wherein said hot-forming comprises forming a track in said wire for guiding the rolling elements of said anti-friction bearing.

* * * * *